United States Patent
Chang et al.

(10) Patent No.: US 7,172,318 B2
(45) Date of Patent: Feb. 6, 2007

(54) LIGHT TUNNEL AND PROJECTION SYSTEM UTILIZING THE SAME

(75) Inventors: Sean Chang, Taoyuan Hsien (TW); Yu-Chuan Chen, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 105 days.

(21) Appl. No.: 11/012,105

(22) Filed: Dec. 16, 2004

(65) Prior Publication Data

US 2005/0270793 A1 Dec. 8, 2005

(30) Foreign Application Priority Data

Jun. 8, 2004 (TW) ............................... 93116398 A

(51) Int. Cl.
*F21V 7/04* (2006.01)

(52) U.S. Cl. ............... 362/297; 362/298; 362/301; 362/346; 353/99; 359/627

(58) Field of Classification Search ................ 362/297, 362/346, 298, 299, 300, 301; 359/640, 620–626, 359/237, 627; 353/31, 33, 37, 98, 99; 385/15, 385/133, 39, 31
See application file for complete search history.

(56) References Cited

U.S. PATENT DOCUMENTS

| 4,765,718 | A | * | 8/1988 | Henkes | 349/62 |
| 6,856,727 | B2 | * | 2/2005 | Li | 385/31 |
| 6,948,832 | B2 | * | 9/2005 | Saccomanno et al. | 362/347 |
| 2003/0076423 | A1 | * | 4/2003 | Dolgoff | 348/222.1 |
| 2004/0201898 | A1 | * | 10/2004 | Chang et al. | 359/640 |
| 2005/0088624 | A1 | * | 4/2005 | Lee et al. | 353/31 |

* cited by examiner

*Primary Examiner*—Thomas M. Sember
(74) *Attorney, Agent, or Firm*—Birch, Stewart, Kolasch & Birch, LLP

(57) ABSTRACT

A projection system and a light tunnel applied in the projection system. The light tunnel comprises a first reflector, a second reflector, a third reflector, a fourth reflector, a light entrance, and a light exit. A distance between the third and fourth reflectors gradually changes from the light entrance to the light exit. The distance between the third and fourth reflectors at the light entrance and the light exit is less than length of each of the first and second reflectors. Thus, the light tunnel can be easily held and applied to various projection systems using various light sources and image generation devices.

20 Claims, 6 Drawing Sheets

LIGHT TUNNEL AND PROJECTION SYSTEM UTILIZING THE SAME

BACKGROUND

The invention relates to a projection system with a light tunnel that can uniformize brightness distribution of a light from a light source of the projection system, and in particular, to a light tunnel that can be easily held and applied to various projection systems with various light sources and image generation devices.

The conventional optical projection system is widely applied to presentation and entertainment. During operation, a light source thereof generates a light passing through an image generation device that changes the light to different hues and brightness. The light passing through the image generation device is projected to a screen so that audiences can see projected images.

Referring to FIG. 1, a conventional optical projection system 1 comprises a light source 10, a color wheel 11, a light tunnel 12, a transmission lens 14, an image generation device 16, and a projection lens 18. The light source 10 generates a light through the color wheel 11, the light tunnel 12, and the transmission lens 14 consecutively. Then, the light is projected to the image generation device 16, such as a digital micromirror device (DMD) with a plurality of pixel mirrors (not shown) that can be activated and deactivated. Specifically, according to digital signals for the required images, the pixel mirrors can be rotated respectively to generate required pixel brightness. After the color wheel 11 provides the required pixel brightness, the images based on the digital signals are obtained. Then, the light is projected to a screen 20 via the projection lens 18 so that audiences can see projected images. Additionally, rather than the digital micromirror device, the image generation device may be a liquid crystal display (LCD). Since the liquid crystal display can inherently adjust the hue and brightness of the light, the color wheel can be omitted. Generally speaking, brightness distribution of the light from the light source 10 is not uniform, such that brightness at the center of the display exceeds that at the edges. The light tunnel 12 is provided to overcome the above problem.

The conventional light tunnel 12 comprises four reflectors as shown in FIG. 2. To assemble the light tunnel 12, each reflector contacts each other at each edge, and adhesive 13 is coated at space between each edge. FIG. 6A is a cross section of the light tunnel 12. Two sets of reflectors 120, 120' are combined to a rectangle to form a light entrance 122 and a light exit 124. The adhesive 13 may be epoxy, silicon rubber, or ultra-violet (UV)-curved adhesive. Inner surfaces of both reflectors 120, 120' reflect the light. Both reflectors 120 have same area. Both reflectors 120' have same area. Based on the application, the area of the reflector 120 may be the same as or different from that of the reflector 120'. Thus, after the light enters the light tunnel 12 from the light entrance 122, it is reflected by the inner surfaces of the reflectors 120, 120' repeatedly. Then, the light emitted from the light exit 124 is thus more uniform in brightness distribution. FIG. 4A is a schematic view of brightness distribution of the light before/after passing the light tunnel 12, wherein arrow X represents position, and arrow Y represents brightness of the light. The brightness distribution of the light before entering the light entrance 122 is shown on the left of the light tunnel 12, wherein the brightness at the center clearly exceeds that at the edge. The brightness distribution of the light emitted from the light exit 124 is shown on the right of the light tunnel 12, the brightness at the center being substantially equal to that at the edge, providing uniform in brightness distribution accordingly.

Since the cross section of the light entrance 122 is the same as that of the light exit 124, attachment of the light tunnel 12 to various light sources or other devices can be difficult. Thus, another conventional light tunnel 32 is provided, as shown in FIG. 3A, comprising four reflectors, two of which are labeled as 320, and the other two as 320'. The reflectors 320 are trapezoid and opposite to each other. The reflectors 320' are rectangular and opposite to each other. Thus, the light tunnel 32 is trapezoidal with a light entrance 322 and a light exit 324. FIG. 3B shows top and side views of the light tunnel 32. As a result, the light tunnel 32 can be combined with various light sources, image generation devices, and other devices. FIG. 4B is a schematic view of brightness distribution of the light of the light tunnel 32. Since the conventional light tunnel is disclosed in U.S. Pat. Nos. 5,625,738 and 6,332,688, its detailed description is omitted.

Generally speaking, the light tunnel must be precisely positioned in the optical projection system so that the light processed thereby can be projected to a predetermined position. If the light tunnel is not properly positioned, the accuracy of the projected image is affected. Since the light tunnel 32 comprises non-parallel edges at its sides, it is difficult to precisely align during manufacture. Even if the light tunnel is precisely aligned, it can further be dislocated by vibration or other factors, also resulting in imprecise projection. Moreover, as shown in FIG. 6A, the adhesive 13 at the edges of the light tunnel often protrudes from the outer surfaces of the reflectors 120, 120'. Thus, it is difficult to hole the light tunnel due to the protruding adhesive. As a result, it is desirable for a light tunnel that can be easily held and applied to various projection systems with various light sources and image generation devices.

SUMMARY

In view of this, an embodiment of the invention provides a projection system with a light tunnel that can uniformize brightness distribution of a light from a light source the projection system. Additionally, the light tunnel can be easily held and applied to various projection systems with various light sources and image generation devices.

Accordingly, an embodiment of the invention provides a light tunnel comprising a first reflector, a second reflector, a third reflector, a fourth reflector, a light entrance, and a light exit. Light enters the light tunnel from the light entrance and is reflected by the first, second, third, and fourth reflectors and emitted from the light exit. The first and second reflectors are rectangular, opposite, parallel, and comprise the same area so as to be easily mounted.

Additionally, the third and fourth reflectors are opposite to each other. A distance between the third and fourth reflectors at the light entrance is different from a distance between the third and fourth reflectors at the light exit. The distance between the third and fourth reflectors at the light entrance is less than length of each of the first and second reflectors. The distance between the third and fourth reflectors at the light exit is less than length of each of the first and second reflectors. The distance between the third and fourth reflectors changes between the light entrance and the light exit in a gradual or step manner.

Moreover, the light tunnel is applied to a projection system to uniformize brightness distribution of the light generated by a light source. The projection system comprises a transmission lens, an image generation device, and a projection lens. The light is projected to a screen via the light tunnel, the transmission lens, the image generation device, and the projection lens consecutively. The image generation device may be a liquid crystal display. The projection system may further comprise a color wheel located between a light source and the image generation device when a digital micromirror device is utilized as such.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION

Figure 5A:
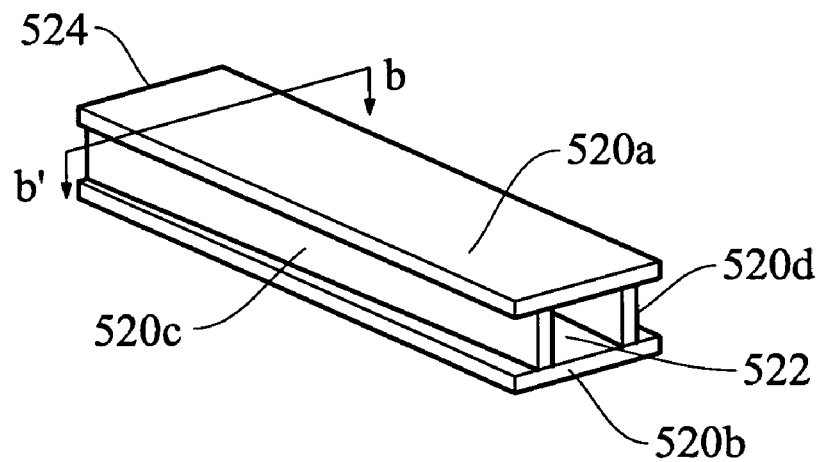
FIG. 5A is a schematic view of a light tunnel as disclosed in an embodiment of the invention.
Figure 5B:
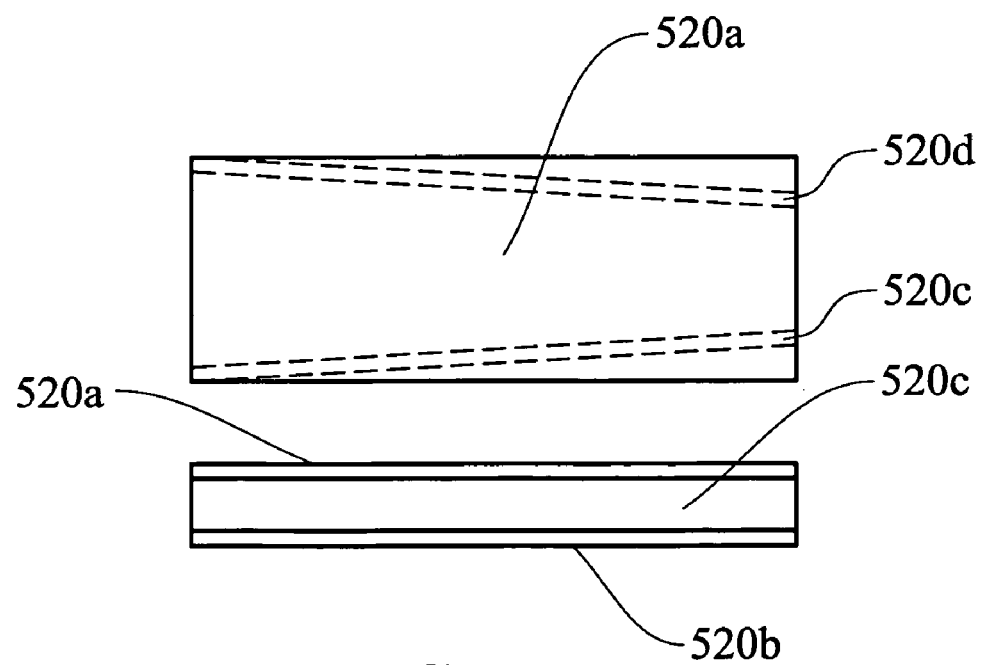
FIG. 5B shows top and side views of the light tunnel in FIG. 5A.

FIG. 5A is a schematic view of a light tunnel 52 as disclosed in an embodiment of the invention. The light tunnel 52 comprises a first reflector 520a, a second reflector 520b, a third reflector 520c, a fourth reflector 520d, a light entrance 522, and a light exit 524. The first reflector 520a and the second reflector 520b are rectangular, opposite, parallel, and comprise the same area. The third reflector 520c and the fourth reflector 520d are rectangular and opposite to each other. Inner surfaces of the first, second, third, and fourth reflectors 520a, 520b, 520c, and 520d are reflective. A cross section of the light entrance 522 is different from that of the light exit 524. Distance between the third reflector 520c and the fourth reflector 520d gradually changes from the light entrance 522 to the light exit 524. The distance between the third reflector 520c and the fourth reflector 520d at the light entrance 522 is less than length of each of the first reflector 520a and the second reflector 520b. The distance between the third reflector 520c and the fourth reflector 520d at the light exit 524 is less than length of each of the first reflector 520a and the second reflector 520b. That is, the third reflector 520c and the fourth reflector 520d do not protrude beyond edges of the first reflector 520a and the second reflector 520b. FIG. 5B shows top and side views of the light tunnel 52. As shown in the top view of the FIG. 5B, the third reflector 520c and the fourth reflector 520d are located inside the first reflector 520a, but do not protrude beyond edges of the first reflector 520a. After the light enters the light tunnel 52 from the light entrance 522, it is reflected by the inner surfaces of the reflectors 520a, 520b, 520c, and 520d repeatedly. Then, the light is emitted from the light exit 524 so that uniformity of the brightness distribution thereof can be largely enhanced. Furthermore, since the third reflector 520c and the fourth reflector 520d do not protrude beyond the edges of the first reflector 520a and the second reflector 520b, the light tunnel 52 is easily held in an optical projection system. Also, since the first reflector 520a and the second reflector 520b are rectangular and parallel, the light tunnel is easily mounted. Moreover, after the light tunnel 52 is held and fixed, it is difficult to be dislocated or fell off due to external shock, thus improving location problem of the light tunnel.

Figure 6A:
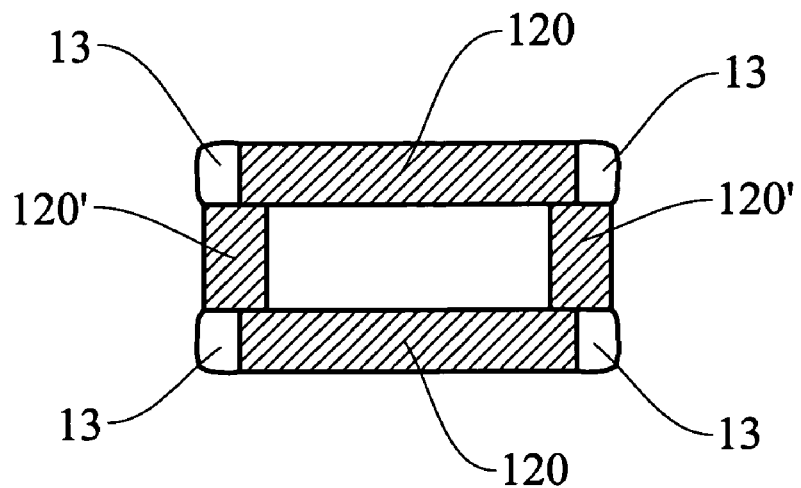
FIG. 6A is a cross section of the light tunnel along line a–a' in FIG. 2.
Figure 6B:
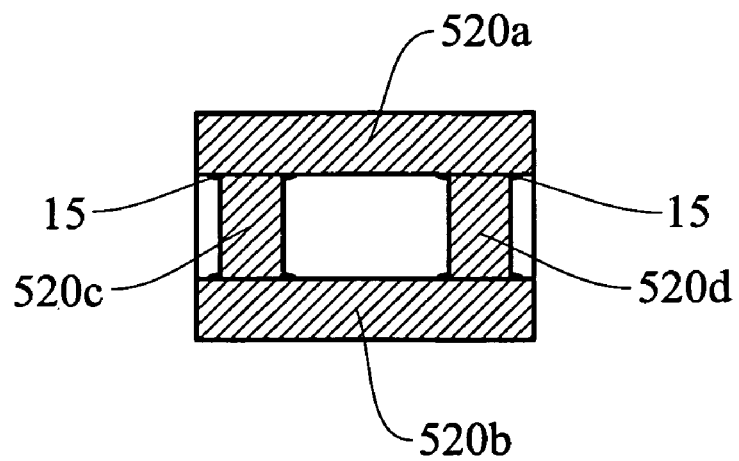
FIG. 6B is a cross section of the light tunnel along line b–b' in FIG. 5A.

FIG. 6B is a cross section of the light tunnel 52 along line b–b' in FIG. 5A. To assemble the light tunnel 52, adhesive 15 is coated at the lower surface of the first reflector 520a and the upper surface of the second reflector 520b to fix the third and fourth reflectors 520c and 520d between the first and second reflectors 520a and 520b. Although some of the adhesive 15 is extruded from assembly, the extruded adhesive 15 does not flow past the edges of the first and second reflectors 520a and 520b since the third and fourth reflectors 520c and 520d are located inside the first and second reflectors 520a and 520b. Thus, the light tunnel 52 can be accurately positioned in the optical projection system.

A light tunnel according to an embodiment of the invention need only comprise a cross section of the light entrance 522 differing from that of the light exit 524, such that the distance between the third and fourth reflectors 520c and 520d changes from the light entrance 522 to the light exit 524 in a step manner as long as the distance between the third and fourth reflectors 520c and 520d at the light entrance 522 is less than that at the light exit 524. Even if the distance between the third and fourth reflectors 520c and 520d at the light entrance 522 exceeds that at the light exit 524, the same effect can also be attained.

Figure 1:
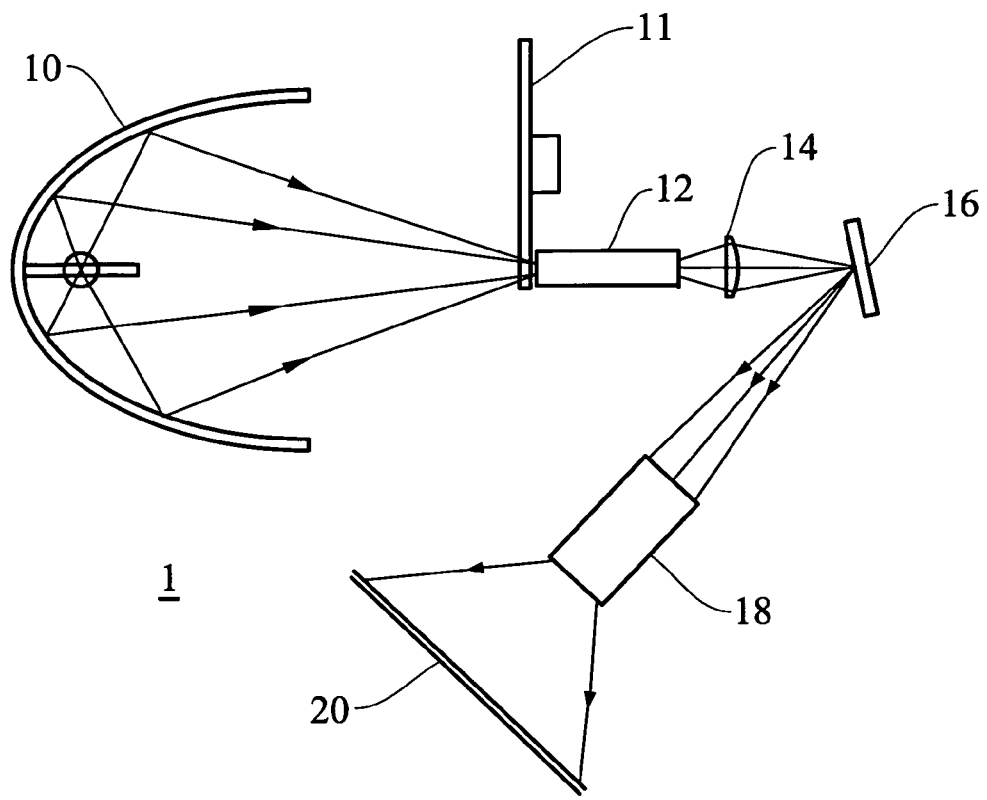
FIG. 1 is a schematic view of a conventional optical projection system.
Figure 2:
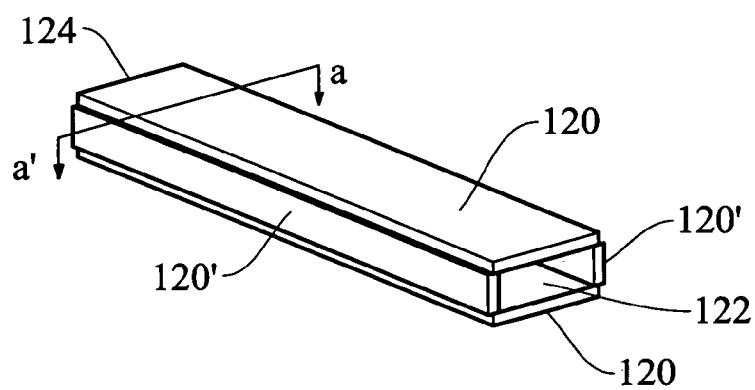
FIG. 2 is schematic view of a conventional light tunnel of the conventional optical projection system.
Figure 3A:
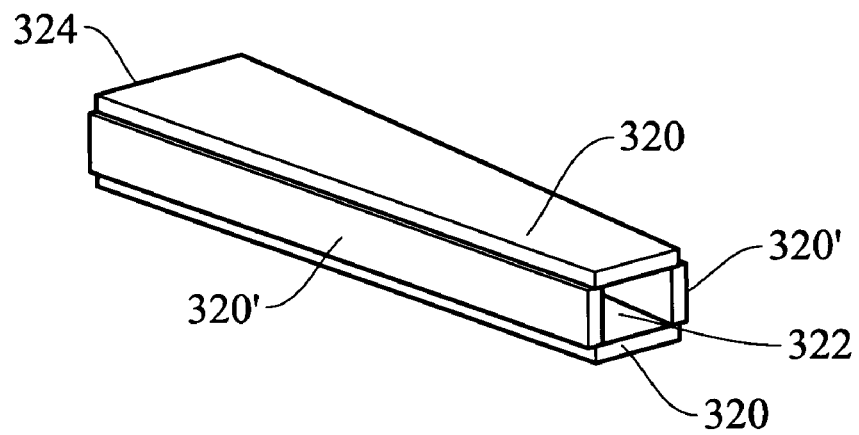
FIG. 3A is a schematic view of another conventional light tunnel of the conventional optical projection system.
Figure 3B:
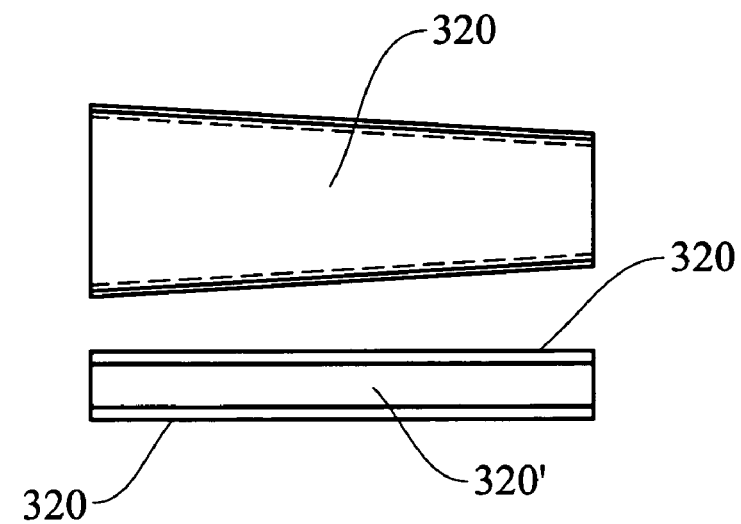
FIG. 3B shows top and side views of the light tunnel in FIG. 3A.
Figure 4A:
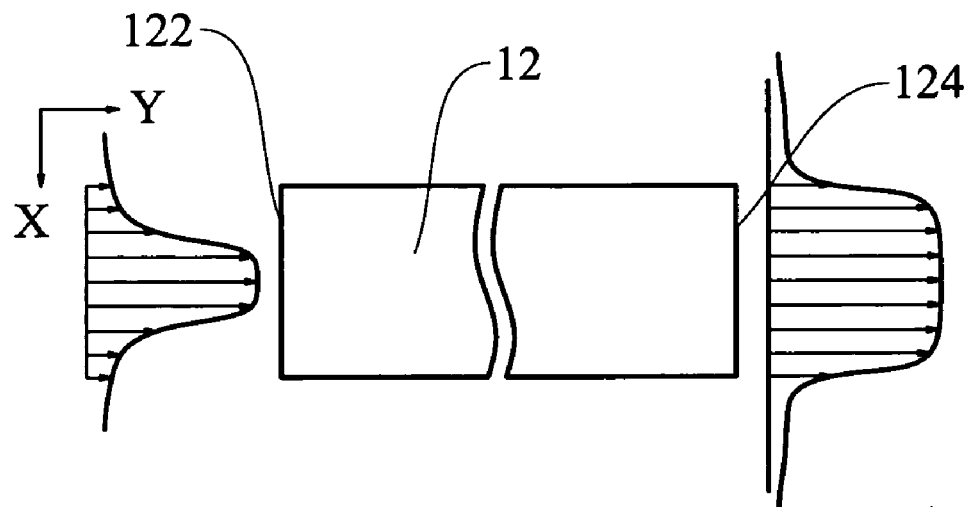
FIG. 4A is a schematic view of brightness distribution of light processed by the light tunnel in FIG. 2.
Figure 4B:
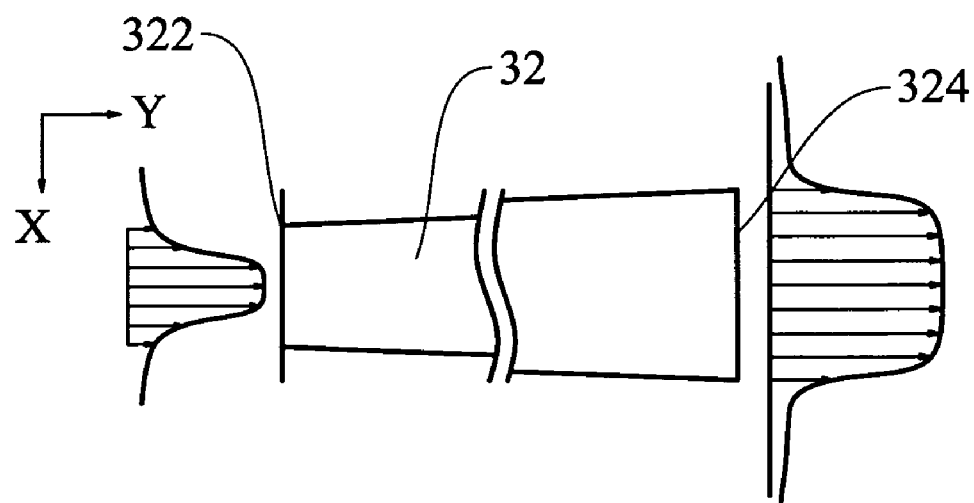
FIG. 4B is a schematic view of brightness distribution of light processed by the light tunnel in FIG. 3A.
Figure 7A:
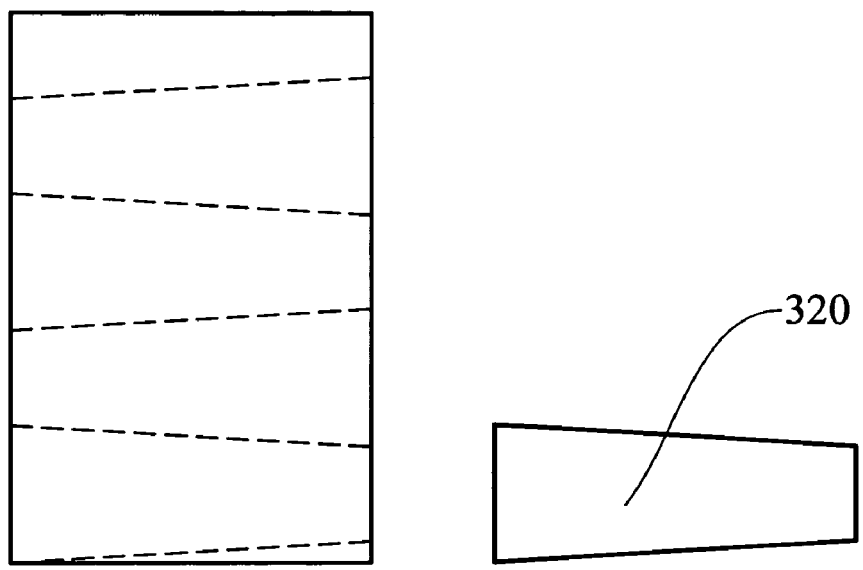
FIG. 7A is a schematic view showing a method for cutting the light tunnel in FIG. 3A.
Figure 7B:
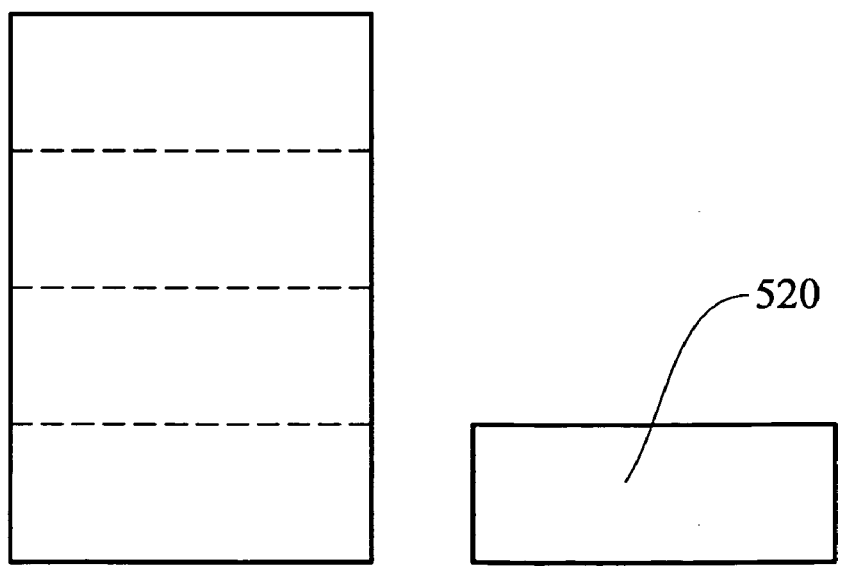
FIG. 7B is a schematic view showing a method for cutting the light tunnel in FIG. 5A.

Moreover, since the conventional light tunnel 32 in FIG. 3A is trapezoid to be conveniently assembled with various light sources and image generation devices, it comprises trapezoidal reflectors, thus wasting material of the reflectors. Specifically, FIG. 7A is a schematic view showing a method for cutting the reflectors of the light tunnel 32. Since cutting lines of the trapezoid reflector 320 are not parallel with each other, the cutter is difficult to be positioned during cutting, thus increasing time and difficulty. On the contrary, FIG. 7B is a schematic view showing a method for cutting the reflectors of the light tunnel 52 as disclosed in an embodiment of the invention. Since all the reflectors 520 are rectangular, they are easily cut without the conventional problems. Although the light tunnel 52 is manufactured by the cutting method as shown in FIG. 7B, it still can be assembled with various light sources and image generation devices. Thus, it can be seen that the light tunnel of the invention has highly practical value.

It is understood that the light tunnel 52 can be applied to a projection system to uniformize brightness distribution of the light generated by a light source. The projection system comprises a transmission lens, an image generation device, a projection lens. The light is projected to a screen via the light tunnel, the transmission lens, the image generation device, and the projection lens in turn. The image generation device may be a liquid crystal display. The projection system may further comprise a color wheel located between a light source and the image generation device that is a digital micromirror device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light tunnel, for reflecting a light, comprising a first reflector, a second reflector, a third reflector, a fourth reflector, a light entrance, and a light exit, wherein the light enters the light tunnel from the light entrance so as to be reflected by the first, second, third, and fourth reflectors and emitted from the light exit, and wherein the first and second reflectors are rectangular, opposite and parallel, the third and fourth reflectors are opposite to each other, a distance between the third and fourth reflectors at the light entrance is different from a distance between the third and fourth reflectors at the light exit, the distance between the third and fourth reflectors at the light entrance is less than the length of each of the first and second reflectors, and the distance between the third and fourth reflectors at the light exit is less than length of each of the first and second reflectors.

2. The light tunnel as claimed in claim 1, wherein the distance between the third and fourth reflectors gradually changes from the light entrance to the light exit.

3. The light tunnel as claimed in claim 1, wherein the area of the first reflector is the same as the area of the second reflector, so as to be conveniently held.

4. The light tunnel as claimed in claim 1, wherein the light tunnel is applied to a projection system to uniformize brightness distribution of the light generated by a light source.

5. The light tunnel as claimed in claim 4, wherein the projection system comprises a transmission lens, an image generation device, and a projection lens, and the light is projected to a screen via the light tunnel, the transmission lens, the image generation device, and the projection lens in turn.

6. The light tunnel as claimed in claim 5, wherein the image generation device is a liquid crystal display.

7. The light tunnel as claimed in claim 5, wherein the projection system further comprises a color wheel located between the light source and the image generation device when the image generation device comprises a digital micromirror device.

8. A projection system comprising:
a light source generating a light;
a light tunnel, for uniformizing brightness distribution of the light generated by the light source, the light tunnel comprising a first reflector, a second reflector, a third reflector, a fourth reflector, a light entrance, and a light exit, wherein the light enters the light tunnel from the light entrance so as to be reflected by the first, second, third, and fourth reflectors and emitted from the light exit, and wherein the first and second reflectors are rectangular, opposite and parallel, the third and fourth reflectors are opposite to each other, a distance between the third and fourth reflectors at the light entrance is different from a distance between the third and fourth reflectors at the light exit, the distance between the third and fourth reflectors at the light entrance is less than the length of each of the first and second reflectors, and the distance between the third and fourth reflectors at the light exit is less than the length of each of the first and second reflectors;
a transmission lens receiving and transmitting the light emitted from the light exit;
an image generation device receiving the light from the transmission lens and generating an image; and
a projection lens projecting the image to a screen.

9. The projection system as claimed in claim 8, wherein the distance between the third and fourth reflectors gradually changes from the light entrance to the light exit.

10. The projection system as claimed in claim 8, wherein the area of the first reflector is the same as the area of the second reflector, so as to be conveniently held.

11. The projection system as claimed in claim 8, wherein the image generation device is a liquid crystal display.

12. The projection system as claimed in claim 8, further comprising a color wheel located between the light source and the image generation device when the image generation device comprises a digital micromirror device.

13. A light tunnel comprising a first reflector, a second reflector, a third reflector and a fourth reflector, wherein the first and second reflectors are disposed opposite to each other, the third and fourth reflectors are disposed opposite to each other, and side edges of the first and second reflectors are located beyond outer surfaces of the third and fourth reflectors.

14. The light tunnel as claimed in claim 13, wherein the distance between the third and fourth reflectors gradually changes from the light entrance to the light exit.

15. The light tunnel as claimed in claim 13, wherein the area of the first reflector is the same as the area of the second reflector, so as to be conveniently held.

16. The light tunnel as claimed in claim 13, wherein the light tunnel is applied to a projection system to uniformize brightness distribution of the light generated by a light source.

17. The light tunnel as claimed in claim 16, wherein the projection system comprises a transmission lens, an image generation device, and a projection lens, and the light is projected to a screen via the light tunnel, the transmission lens, the image generation device, and the projection lens in turn.

18. The light tunnel as claimed in claim 17, wherein the image generation device is a liquid crystal display.

19. The light tunnel as claimed in claim 17, wherein the projection system further comprises a color wheel located between the light source and the image generation device when the image generation device comprises a digital micromirror device.

20. The light tunnel as claimed in claim 13, wherein the first, second, third and fourth reflectors are rectangular and the first and second reflectors are parallel to each other.

* * * * *